United States Patent [19]
Stout

[11] 3,997,149
[45] Dec. 14, 1976

[54] SHOCK ABSORBING GUARD

[75] Inventor: Richard P. Stout, Whittier, Calif.

[73] Assignee: Technibilt Corporation, Burbank, Calif.

[22] Filed: June 6, 1975

[21] Appl. No.: 584,273

[52] U.S. Cl. .................................. 267/140; 114/219
[51] Int. Cl.² ........................................ F16F 7/12
[58] Field of Search .......... 267/136, 139, 140, 141, 267/153, 182; 5/345 R, 361 B; 47/23; 52/392, 584, 627, 628; 61/48, 54; 114/219, 220; 248/15, 20, 22; 256/1, 13.1; 272/1 R; 273/1.5 R, 55 A; 293/71 R, 88

[56] References Cited
UNITED STATES PATENTS

| | | | |
|---|---|---|---|
| 2,188,082 | 1/1940 | Imhofe | 293/71 R |
| 2,562,957 | 8/1951 | Sipkin et al. | 114/219 |
| 3,104,875 | 9/1963 | Doyle | 273/1.5 R X |
| 3,125,979 | 3/1964 | Darling | 114/219 |
| 3,181,849 | 5/1965 | Mitchell | 267/140 |
| 3,321,924 | 5/1967 | Liddell | 61/54 |
| 3,788,082 | 1/1974 | Narabu | 114/219 X |
| 3,843,182 | 10/1974 | Walls et al. | 267/140 X |
| 3,873,076 | 3/1975 | Evans | 267/140 |

Primary Examiner—Johnny D. Cherry
Attorney, Agent, or Firm—Christie, Parker & Hale

[57] ABSTRACT

An impact or shock absorbing guard for padding structural elements such as poles or the like found on playgrounds, schoolyards, etc. to prevent injuries. The shock absorbing guard affords three stages of impact energy absorption and long service life.

18 Claims, 7 Drawing Figures

SHOCK ABSORBING GUARD

REFERENCE TO RELATED APPLICATION

This application is related to the copending patent application filed concurrently herewith, bearing Ser. No. 584,276 and entitled "Shock Absorbing Guard" and assigned to the same assignee as the present application.

DISCLOSURE OF THE INVENTION

This invention relates generally to resilient shock absorbing guards or protective pads and mmore particularly to an improved shock absorbing structure for preventing injuries due to impact with rigid or hard surfaces such as poles or similar structural elements utilized for mounting playground equipment or the like which are exposed to the participants during athletic events.

The need for shock absorbing guards and surfaces is found principally in schoolyards, playgrounds, sports arenas, gymnasiums, and similar areas where sporting events and contests are conducted. As the result of injuries which have occurred due to the participation in the games in schoolyards and on playgrounds, there is a need for a covering to protect individuals from being accidentally injured by coming into contact with a pole or a similar structural element that the individuals are exposed to and can run into during play. These surfaces not only include poles that mount the basketball hoops but also the hard surfaces on which the games are played which may be constructed of very hard materials such as black top and the like, and may result in injury as a result of a fall thereon. As a result, there has been developed a resilient mat construction having preselected shock or energy absorbing properties incorporated therein for covering the hard surfaced play areas to protect the sporting event participants or the like. One such resilient mat construction is disclosed in U.S. Pat. No. 2,999,431. This type of resilient protective mat is particularly advantageous as to its shock absorbing properties for breaking falls on hard planar surfaces. This type of mat construction may not be adequate for use with non-planar surfaces such as strucural elements including poles or pipes or the like used to mount goal posts, baskets and similar game items to which the participants may be exposed and run the risk of striking while participating in the games. The shock absorbing covering or guard for such a post must provide adequate shock absorbing properties through various ranges of impact energy that various participants may impart thereto. To this end, the participants in a schoolyard, for example, may vary in age, height and weight and as a result may strike a post while travelling at varing speeds and thereby impacts of varying energy levels are imparted to a shock absorbing guard. The large variance in intensity energy levels depend upon the velocity or speed at which the participant was travelling at the time of impact as well as the overall weight of the participant. Accordingly, a shock absorbing guard for such purposes must have shock absorbing capabilities to protect particpants of different sizes against impacts of varying energy levels from light to heavy impacts to afford the greatest protection in a single shock absorbing guard. One such shock absorbing guard is disclosed in U.S. Pat. No. 3,181,849. The shock absorbing guard disclosed in this prior art patent iss utilized to wrap around a tubular object such as a playground pole.

The aforementioned prior art patent teaches that it be formed in a flat planar shape and then wrapped around and secured to a pole in a cylindrical configuration. As a result of being manufactured in a planar form, when it is wrapped around a pole such a protective guard produces stresses in the outer skin as a result of tension which when exposed to the environment renders the useful life of the shock absorbing guard relatively short. In certain geographical areas when such a shock absorbing guard is exposed to sunlight, ozone and/or smog, the stressed outer surface breaks down as a result of exposure to such environmental conditions whereby the guard becomes ineffective in a matter of weeks.

It has been found that pole protective pads constructed of rubber on a rubber composition as disclosed in U.S. Pat. No. 3,181,849 as a result of having its outer skin in tension and when exposed to sunlight, ozone and other atmospheric influences will deteriorate much more rapidly, by several orders of magnitude, merely as a result of the stressed skin condition. The stress cracks in the stretched outer surface propagate through the pads leading to complete or nearly complete failure of the pole pads. If a comparison between the stressed and unstressed surfaces is made over a relatively short period of time, a week, the cracks in the stressed surface would be visible and the unstressed surface would appear exactly as installed. At the end of several months particularly in atmospheric conditions such as found in California where there is an abundance of sunlight, ozone or smog the differences in these surfaces are dramatic so that the pole pad is essentiallly valueless after a relatively short time after installation. It is necessary in such prior art constructions to employ very high quality materials and compounds in an attempt to prolong the useful life of the pole pads thereby increasing the manufacturing cost. Accordingly, there is a present need for a shock absorbing cover or guard that is particularly adapted for use on non-planar surfaces, circular, rectangular, or the like that affords shock absorbing properties over a relatively wide range of impact energy levels normally encountered during athletic participation and yet has a relatively long service life. In addition, such shock absorbing guards should be inexpensively constructed so that they may be readily assembled on its mounting structure and reliably attached thereto.

The present invention provides an improved shock absorbing guard having a relatively long service life including exposed to various adverse environmental conditions and yet can be constructed of relatively inexpensive mundane materials that are readily available. The shock absorbing guard of the present invention includes improved shock absorption capabilities in that three stages of shock absorption are provided. The shock absorbing guard of the present invention can be constructed to conform to the surface on which it is mounted without producing stresses in its outer skin leading to a short life. For example, it may be constructed in either an arcuate, semi-circular or tubular form when it is to be attached to a tubular object such as a pole. As a result of the ability to manufacture a shock absorbing guard of relatively inexpensive materials, the manufacturing costs for forming the shock absorbing guards into an arcuate or semi-circular configuration is largely offset.

From a structural standpoint, the shock absorbing guard of the present invention comprises a shock absorbing element having a plurality of spaced apart, resilient, substantially flat shock absorbing surfaces arranged in parallel rows and constructed and defined on the outer face of the element for receiving the impact energy. The inner face of the element is constructed and defined with a plurality of spaced apart, resilient, substantially flat shock absorbing surfaces arranged in parallel rows intermediate the parallel rows of the shock absorbing surface of the outer face of the element and spaced a preselected distance inwardly of the surfaces on the outer face of the element. A plurality of resilient, solid ribs are individually connected with one end of a shock absorbing surface on the outer face of the element with the adjacent end of a shock absorbing surface on the inner face of the element to thereby interconnect each of the shock absorbing surfaces into a unitary shock absorbing element.

A plurality of resilient, solid shock absorbing fingers are constructed integral with, individual to and continuous with the inner surface of at least some of the shock absorbing surfaces of the outer face of the element and arranged substantially perpendicular to said inner surface and extending a preselected distance outwardly therefrom and terminating short of the inner surface of the inner shock absorbing surfaces of the inner face of the element to provide an additional stage of energy absorption. The shock absorbing surfaces on the inner face of the element are engageable with the mounting surface or the pole mounting the shock absorbing guard. The shock absorbing element may be formed into a semi-circular form and a pair of such elements may be utilized for enclosing the pole therebetween. Means for securing the shock absorbing element to its mounting surface may be in the form of bands mounted between the outer shock absorbing surfaces on the outer face of the element and secured in a closed loop for maintaining the shock absorbing element in a shock absorbing position without exposing the securing means to the individuals impacting the guard.

These and other features of the present invention may be more fully appreciated when considered in the light of the following specification and drawings, in which.

DESCRIPTION OF THE PREFERRED EMBODIMENTS

Figure 1:
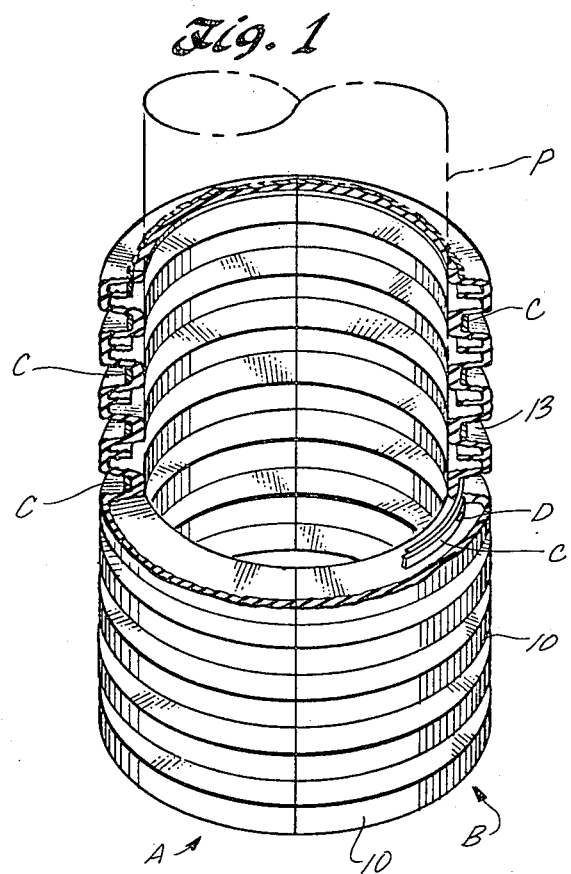
FIG. 1 is a front elevational view of a shock absorbing guard, with portions broken away and shown in section and a mouting pole illustrated in dotted outline as it would be secured to a pole and embodying the invention.
Figure 2:
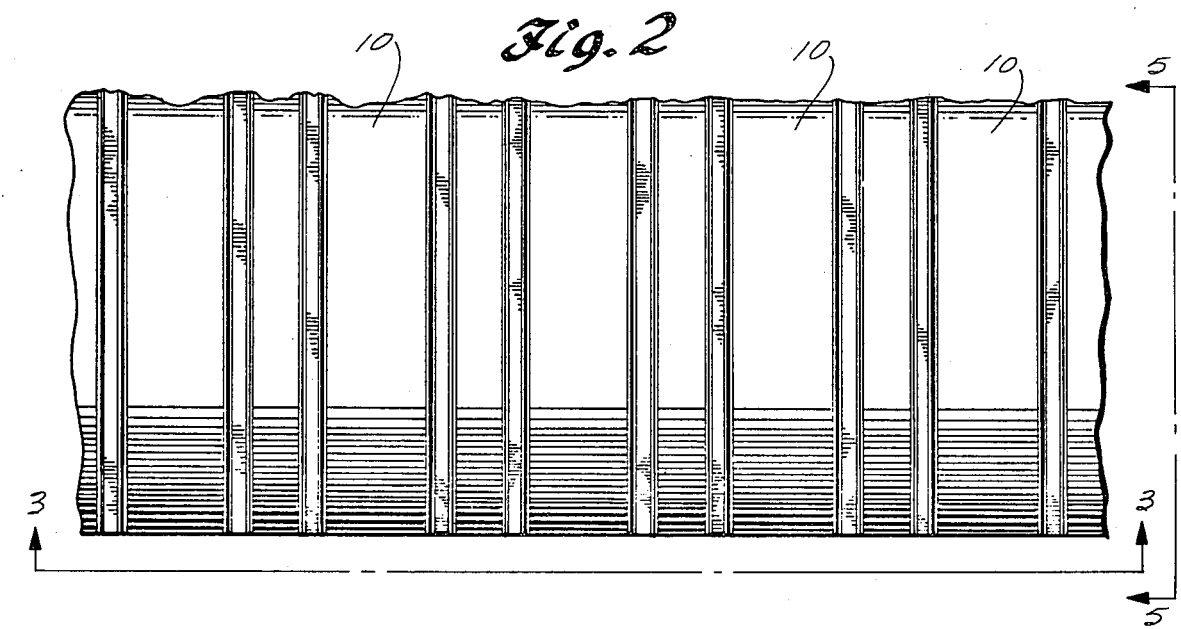
FIG. 2 is a partial, front side elevational view of a detached shock absorbing element as illustrated in FIG. 1.
Figure 3:
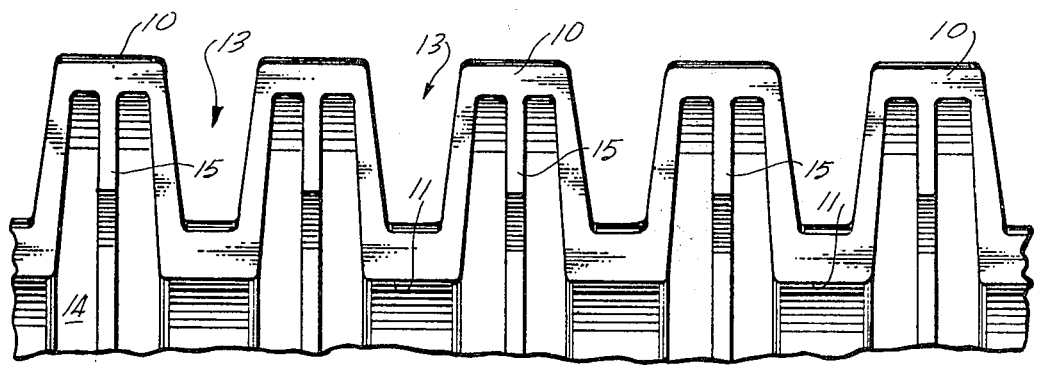
FIG. 3 is a sectional view of the shock absorbing element taken along the line 3—3 of FIG. 2.
Figure 4:
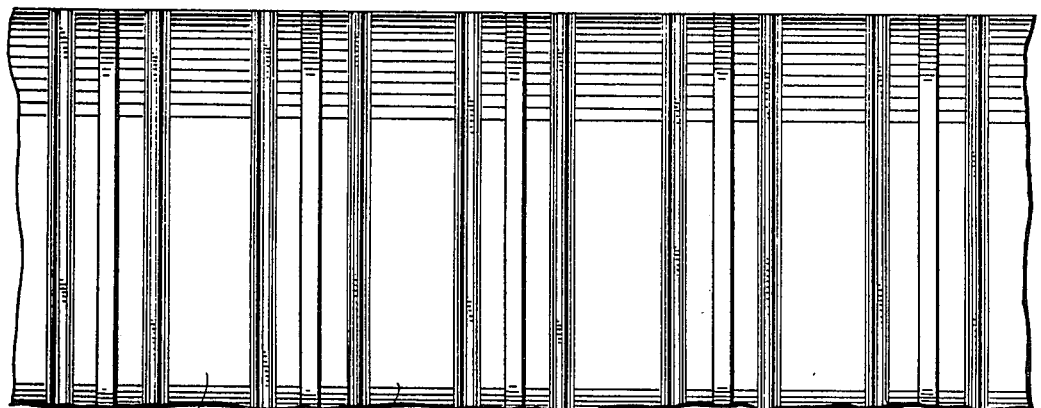
FIG. 4 is a partial, back side elevational view of the detached section illustrated in FIG. 2.
Figure 5:
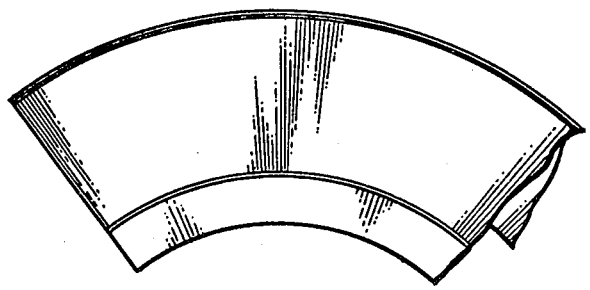
FIG. 5 is a partial, end elevational view taken along the line 5—5 of FIG. 2.

Now referring to the drawings, the shock absorbing guards embodying the present invention will be considered in detail. The general organization of the shock absorbing guards as they may be applied to a cylindrical or tubular element such as a playground pole P is illustrated in FIG. 1. The shock absorbing guard of the present invention, as illustrated in FIG. 1, is constructed and defined to surround the pole P by mounting two semicircular shock absorbing elements A and B to completely surround the pole P. The shock absorbing elements A and B may have any convenient length. The semicircular shock absorbing elements A and B are secured to the pole P by securing means which may be in the form of metallic straps C that are wrapped around the shock absorbing elements A and B and secured in a closed loop by means of a fastener, shown in the form of a "pop" rivet D. It should be recognized that although a pair of shock absorbing elements A and B are illustrated in FIG. 1, that similar sections may be arranged adjacent the elements A and B to cover even larger areas of the pole P in accordance with the needs of the particular playground or schoolyard application of the shock absorbing guards.

Figure 6:
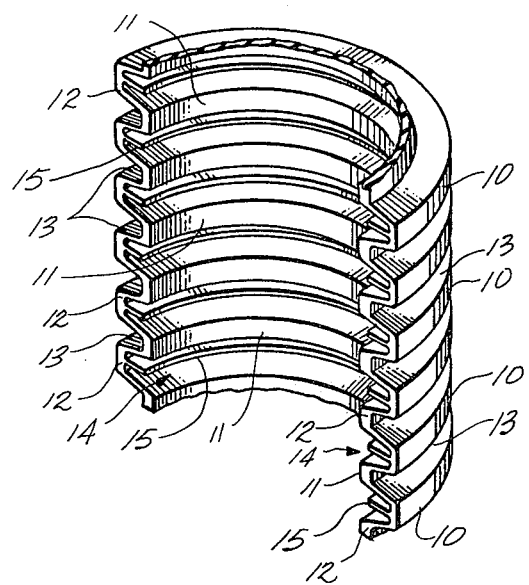
FIG. 6 is a perspective view of a detached section of the shock absorbing guard of FIG. 1, with portions brokenaway.

The shock absorbing guards comprising the elements A and B are preferably molded in an arcuate configuration to conform with the outer contour of the structural element mounting the guard such as the pole P. As is clearly evident from examining the detached shock absorbing element A of FIG. 6, it is formed of a semicircular construction for surrounding one-half of the outer surface of the pole P. Since both shock absorbing elements A and B are the same, the element A only will be described. The shock absorbing element A is preferably molded from a resilient, durable, weather-resistant material such as a rubber composition. In some instances the shock absorbing guard may be constructed of certain plastic materials or synthetic rubber having the desired physical properties. Rubber compositions have been found to be preferable for constructing the shock absorbing guard of the present invention. The ingredients of the rubber composition that are employed may be selected by those skilled in the art to provide the necessary physical characteristics in accordance with the end use of the shock absorbing guards, taking into consideration the participants in the sporting or athletic events that will be striking the shock absorbing guards. A shock absorbing guard constructed of a rubber composition has been found to be more effective than guards constructed of solid rubber, foam rubber, plastic or felt. In accordance with the teachings of the present invention, it is important that the shock absorbing guard be formed or molded to conform the shape of the structure upon which it is to be mounted. Accordingly, a circular or semicircular shape for the shock absorbing element A is preferred when it is to be mounted on a pole since it eliminates the stresses in the outer skin of the shock absorbing element A that are produced as a result of molding such an element in a planar configuration and then causing it to conform to the shape of the element on which it is mounted. This molding into a circular or semicircular configuration eliminates the tension at the outer skin of the shock absorbing element leaving the skin in a relaxed condition and thereby eliminates the immediate structural failures resulting in the prior art shock absorbing guards leading to a long service lift including under adverse environmental conditions. It will be recognized that in addition to the semicircular configuration illustrated in the drawings that a shock absorbing guard may be constructed of a tubular form with a longitudinal slit or opening to allow the tubular shock absorbing guard to be slipped around and mounted on the pole P. The final configuration selected for the shock absorbing guard and the method of manufacture or molding techniques should be selected consistent with the economic considerations of the manufacturer and the end use of the shock absorbing guards. As a result of molding the shock absorbing guards in a semicircular or arcuate configuration so as to eliminate the skin stresses, it has been found that rather inexpensive and mundane materials may be selected to make up the rubber compound or the like and yet provide the desired physical properties for the guard. This factor will offset the additional manufacturing costs for the molds or the like as a result of specifying the semicircular or tubular configuration for the shock absorbing guards.

The shock absorbing element A is constructed and defined to provide three stages of energy absorbing levels upon impact. As illustrated, a plurality of spaced apart, resilient, substantially flat shock absorbing surfaces 10 are arranged in parallel rows on the outer face of the shock absorbing element A. The inner face of the shock absorbing element A is constructed and defined with a similar plurality of spaced apart, resilient, and substantially flat shock absorbing surfaces 11 arranged in parallel rows intermediate the parallel rows of shock absorbing surfaces 10 and spaced a preselected distance inwardly of the shock absorbing surfaces 10. The shock absorbing surfaces 10 and 11 are individually connected by means of a plurality of solid resilient ribs 12. The ribs 12 are arranged transverse to the surfaces 10 and 11 for individually connecting one end of a shock absorbing surface 10 and with the adjacent end of a shock absorbing surface 11 to thereby interconnect each of the shock absorbing surfaces 10 and 11 into the shock absorbing element A. When the element A is constructed and defined in this relationship, a plurality of spaced, parallel openings 13 are defined on the outer face of the element A. Similarly, the inner face of the element A is constructed and defined with similar spaced parallel openings 14. The openings 14 are arranged on the opposite side of the shock absorbing surfaces 10 and define the thickness of these surfaces. The shock absorbing surfaces 11 are normally arranged to be in direct engagement with the structural element to be padded or the pole P as is evident from examing FIG. 1.

Figure 6A:
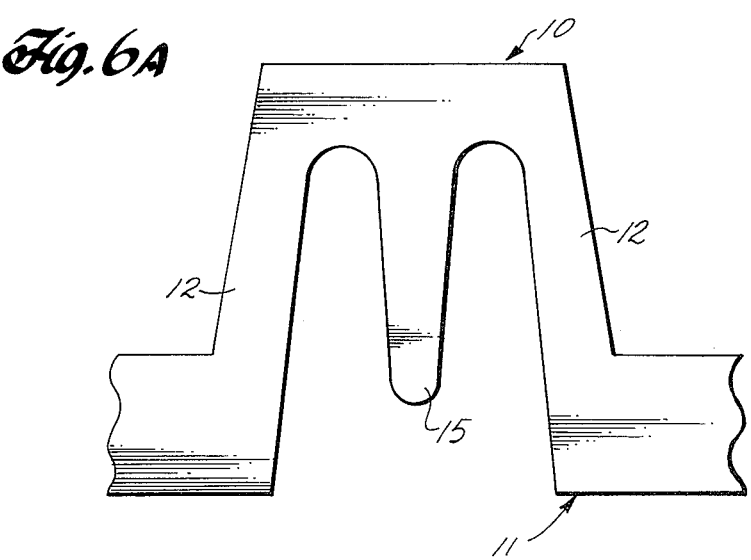
FIG. 6A is a partial, enlarged end elevational view of the shock absorbing element.

A third level of impact or shock absorption is afforded by the provision of resilient fingers 15 constructed integral with the back side of the impact surfaces 10, as best seen from examining FIG. 6A. The fingers 15 extend outwardly from the surface 10 a preselected distance and terminate short of the surface 11. The parameters of the fingers 15 including the length thereof are selected consistent with the energy levels absorbed by the surfaces 10 and 11 to provide energy absorption of a third level when the finger 15 is moved against the pole P and collapses thereagainst.

The shock absorbing properties of the element A are dependent upon not only the material selected from constructing the element but also the parameters of the impact surfaces 10 and 11 and the ribs 12. The amount of stiffness or resilience that the element A exhibits can be controlled by controlling the thickness of the ribs 12. An increase in the thickness of the ribs 12 will increase the stiffness of the element A. The distance between the surfaces 10 and 11 will govern the range of energy levels that may be absorbed.

When mounting the shock absorbing elements A and B to the pole by means of the straps C, they will be mounted at the outer openings 13 intermediate the surfaces 10, as illustrated in FIG. 1. The ends of the straps C may be readily secured by means of a conventional rivet or a "pop" rivet D. When the elements A and B are secured to a pole in this position, the straps C and rivet D are arranged inwardly of the outer impact receiving or shock absorbing surfaces 10 to thereby minimize any danger of injury to persons striking the securing hardware as well as the elements A and B.

With the above structure in mind it should be evident that the shock or impact absorbing properties of the element A vary from the ability to absorb light impacts or impacts of a low energy level to relatively heavy energy levels. It should be evident that impacts received at a low energy level are absorbed by the element A responding by a compressive action. Impact levels of a higher energy level or an intermediate level for the purposes of this disclosure are energy levels that will cause the compressive depression of a shock absorbing surface 10 to be moved inwardly and compress the shock absorbing surface 11 against the pole P and move the fingers 15 toward and/or against the pole P. The higher energy levels that are absorbed are those energy levels below which the shock absorbing surfaces 10 and the fingers 15 collapse against the pole P. It will be recognized that when the impact energy level is high enough to totally compress the element A by causing the surfaces 10 and fingers 15 to impact the pole P, the shock absorbing guard can be considered to have "bottomed out" so that all the applied impact energy may not be absorbed by the guard. The range of impact energy levels of the shock absorbing guards for playground use are easily controlled to allow satisfactory protection without injury over the range of impact energy levels normally associated with athletic activities or games conducted on playgrounds, schoolyards, gymnasiums and the like.

It should now be appreciated that the present invention has advanced the state of the art through the dislosure of a shock absorbing guard that is particularly adapted for use as a protective pad for structural elements mounted on playgrounds, sports arenas, and the like and that afford completely satisfactory shock absorbing properties of three levels of energy and a long service life without degeneration as a result of being exposed to adverse environmental conditions. The shock absorbing guard constructed of a rubber composition reduces playground injuries and is more effective than guards constructed of solid rubber, roam rubber, plastic, felt or similar materials. The shock absorbing guard comprehends the use of a multiplicity of shock absorbing surfaces arranged and constructed to absorb the three levels of energy resulting from an individual bumping the pole thereby protecting him from injury.

What is claimed is:

1. A shock absorbing guard comprising a shock absorbing element having a plurality of spaced apart, resilient shock absorbing surfaces arranged in parallel rows and constructed and defined on the outer face of the element, said shock absorbing surfaces each being constructed and defined to extend a preselected distance longitudinally of the parallel rows on the element and having a planar surface conforming to the shape of the surface mounting the shock absorbing guard, the inner face of the element being constructed and defined with a plurality of spaced apart, resilient, shock absorbing surfaces arranged in parallel rows intermediate the parallel rows of shock absorbing surfaces of the outer face of the element and spaced a preselected distance inwardly of the surfaces on the outer face of the element, the inner shock absorbing elements each being constructed and defined to extend a preselected distance longitudinally of the parallel rows on the element and having a planar surface conforming to the shape of the surface mounting the shock absorbing guard, a plurality of resilient, solid ribs, individually connected with one end of a shock absorbing surface on the outer face of the element with the adjacent end of a shock absorbing surface on the inner face of the element to thereby interconnect each of said plurality of shock absorbing surfaces into a unitary shock absorbing element, a plurality of resilient, solid shock absorbing fingers integral with, and individual to and continuous with the inner surface of at least some of the shock absorbing surfaces of the outer face of the element and arranged substantially perpendicular to said inner surface and extending a preselected distance outwardly therefrom and terminating short of the inner surface of the inner shock absorbing surface of the inner face of the element, the length and number of said shock absorbing fingers being selected to provide a preselected resiliency to the shock absorbing element related to the distance that fingers move into engagement with the surface mounting the shock absorbing guard, the shock absorbing surfaces on the inner face of the element being engageable with the surface mounting the shock absorbing guard.

2. A shock absorbing guard as defined in claim 1 wherein the resilient ribs are angularly related to the connected shock absorbing surfaces of the element, the ribs and the inner and outer shock absorbing surfaces having preselected thicknesses for transmitting and absorbing impact energy received at the outer face of the element.

3. A shock absorbing guard as defined in claim 1 wherein the shock absorbing element is formed with a substantially semicircular configuration for mounting to a substantially round mounting surface.

4. A shock absorbing guard as defined in claim 3 wherein a plurality of the shock absorbing elements are mounted to a substantially round mounting surface for enclosing the mounting surface and including means for securing the thus arranged absorbing elements to the mounting surface.

5. A shock absorbing guard as defined in claim 4 wherein the securing means comprises a plurality of straps mounted between the shock absorbing surfaces on the outer face of the secured elements and a fastener for securing the elements together and to the mounting surface.

6. A shock absorbing guard as defined in claim 5 wherein the fastener comprises a "pop" rivet.

7. A shock absorbing guard as defined in claim 4 wherein the shock absorbing elements are constructed of a durable, weather resistant rubber composition.

8. A shock absorbing guard as defined in claim 1 wherein the shock absorbing element is constructed and formed from a resilient, durable weather resistant material.

9. A shock absorbing guard as defined in claim 8 wherein the material is a rubber composition.

10. A shock absorbing guard as defined in claim 8 wherein the material is a rubber composition formulated to have a resiliency consistent with the range of levels of impact energy imparted by individuals during athletic events and contacts immediately adjacent the surface mounting the shock absorbing guard and thereby providing three stages of shock absorption.

11. A shock absorbing guard as defined in claim 1 wherein the shock absorbing element is substantially semicircular in shape for mounting to a pole.

12. A shock absorbing guard as defined in claim 11 including means for securing a pair of shock absorbing elements to a pole.

13. A shock absorbing guard as defined in claim 1 wherein the shock absorbing element is substantially tubular in shape and is adapted for allowing the element to be slipped around a pole and to be mounted thereto.

14. A shock absorbing guard as defined in claim 13 including means for securing the thus pole mounted shock absorbing element to the pole.

15. A shock absorbing pole guard adapted to be mounted on a playground pole or the like comprising a plurality of shock absorbing elements adapted to be mounted and secured completely around a playground pole or the like, the shock absorbing elements being formed in the shape of the pole or like element without stressing the outer skin of the shock absorbing elements upon being secured thereto, each shock absorbing element having a plurality of spaced apart, resilient, substantially semi-cylindrical shock absorbing surfaces arranged in parallel rows and constructed and defined on the outer face of the element, said arcuate surfaces each being constructed and defined to extend a preselected distance lontitudinally of the shock absorbing element, the inner face of the element being constructed and defined with a plurality of spaced apart, resilient, substantially semi-cylindrical shock absorbing surfaces arranged in parallel rows intermediate the parallel rows of shock absorbing surfaces of the outer face of the element and spaced a preselected distance inwardly of the surfaces on the outer face of the element, said arcuate surfaces each being constructed and defined to extend a preselected distance longitudinally of the shock absorbing element, and a plurality of resilient, solid ribs individually connected with one end of a shock absorbing surface on the outer face of the element with the adjacent end of a shock absorbing surface on the inner face of the element to thereby interconnect each of said plurality of shock absorbing surfaces into a unitary shock absorbing element, the resilient ribs being angularly related to the connected shock absorbing surfaces of the element, the ribs and the inner and outer shock absorbing surfaces having preselected thicknesses for transmitting and absorbing impact energy and coacting in unison to absorb impact energy received at the shock absorbing surfaces on the outer face of the element, the shock absorbing surfaces of the inner face of the element being engageable with the pole or the like mounting the shock absorbing guard, and a plurality of resilient, solid shock absorbing fingers integral with, and individual to and continuous with the inner surface of at least some of the shock absorbing surfaces of the outer face of the element and arranged substantially perpendicular to said inner surface and extending a preselected distance outwardly therefrom and terminating short of the inner surface of the inner shock absorbing surfaces of the inner face of the element, the length and number of said shock absorbing fingers being selected to provide a preselected resiliency to the shock absorbing element related to the distance that fingers move into engagement with the surface mounting the shock absorbing guard.

16. A shock absorbing pole guard as defined in claim 15 including means mounted between the shock absorbing surfaces on the outer face of the element for securing the elements to the pole or the like without exposing the securing means to the playground participants upon impact.

17. A shock absorbing pole guard as defined in claim 16 wherein the securing means comprises a plurality of securing bands encicling the shock absorbing surfaces secured in a closed loop.

18. A shock absorbing pole guard as defined in claim 17 including a fastener for securing the bands in a closed loop.

* * * * *